3,074,980
PROCESS FOR MAKING ACYL AMIDES OF
AMINO ACID SALTS
Carl Peer Lorentzen, Indianapolis, Ind., assignor to The Procter & Gamble Company, Cincinnati, Ohio, a corporation of Ohio
No Drawing. Filed Dec. 18, 1958, Ser. No. 781,188
3 Claims. (Cl. 260—404)

This invention relates to a process for making higher fatty acyl amides of lower aliphatic α-amino monocarboxylic acid salts.

The salts of higher fatty acyl amides of lower α-amino acids are known surface active agents and heretofore have been commercially produced by acylating the amino acid salt with a higher acyl chloride in the presence of alkaline agents. The chief disadvantage of this method is the difficulty of obtaining a pure product. Acyl amides of lower amino acid salts are most effectively used as surface active agents when comparatively free from the by-products formed in the acyl chloride reaction.

When a higher acyl chloride is used in the reaction, hydrogen chloride is liberated and is neutralized by conducting the reaction in an alkaline medium (in the presence of an alkaline agent or an acid condensing agent); this results in the formation of a chloride salt. Soaps are usually formed in side reactions in the acyl chloride condensation. Since an excess of the amino acid salt is often used in an effort to minimize soap formation, the reaction product usually contains unreacted amino acid salts. Such inorganic salts, soaps and unreacted amino acid salts are difficult to separate from the final reaction product. Moreover, the presence of a chloride salt such as sodium chloride with the acyl amide of the amino acid salt is undesirable because the salt imparts hygroscopicity and corrosiveness to the product.

Critical operating conditions such as careful pH control and adjustment have been proposed to reduce the formation of the aforementioned difficultly removable by-products in practice of the acyl chloride method. However, the process conditions suggested have not successfully eliminated the formation of difficultly removable by-products from the acyl chloride method and generally have not simplified the process.

In addition, corrosion problems are involved in the preparation of acyl chloride as an acylating agent in the acyl chloride method since phosphorous trichloride is usually used in the manufacture of this agent.

It is the object of this invention to provide a simple, rapid and complete process for making higher molecular weight acyl amides of lower aliphatic α-amino monocarboxylic acid salts having a minimum of critical operating conditions which process does not result in the formation of by-products which are difficult to remove.

It has been discovered that this and other objects can be attained by using higher molecular weight fatty acid anhydrides instead of the chlorides and by employing at least equimolar proportions thereof in relation to the lower molecular weight aliphatic α-amino monocarboxylic acid salts. The reaction takes place in aqueous solution, with agitation, at low temperatures and in the absence of alkaline agents. The resulting products are higher acyl amides of lower aliphatic α-amino monocarboxylic acid salts and free higher molecular weight fatty acid substantially free from soap, amino acid salts and inorganic salt impurities. The free fatty acid can be separated easily from the acyl amide of the amino acid salt, if desired, by methods hereinafter described.

Higher fatty acid anhydrides hydrolyze very slowly as compared with lower fatty acid anhydrides which react quite rapidly with water and which have properties different in most respects from the higher homologues. Moreover, because of this apparent low reactivity, higher fatty acid anhydrides have enjoyed little commercial use as compared to the lower homologues. It was, therefore, surprising that the higher fatty acid anhydrides reacted so rapidly, easily and completely with the lower aliphatic α-amino monocarboxylic acid salts to form the acyl amides of these amino acid salts, especially in the presence of water. The reaction of the higher fatty acid anhydrides with the amino acid salts in aqueous solution apparently is much faster than the hydrolysis of the anhydrides.

The higher fatty acid anhydrides used as the acylating agents in the process of this invention have the formula $(RCO)_2O$ wherein RCO is an acyl radical ranging in chain length from about 8 to about 22 carbon atoms. Preferred reaction products are obtained using, as acylating agents, higher fatty acid anhydrides having fatty acid radicals ranging in chain length from 10 to 18 carbon atoms. The anhydrides used in the process can be prepared from higher fatty acids or their derivatives by a number of known methods. One method is the dehydration of a higher fatty acid with a lower fatty acid anhydride such as acetic acid anhydride.

Examples of acylating agents which can be used in the process of this invention are the anhydrides of higher saturated and unsaturated fatty acids such as caprylic acid, capric acid, lauric acid, myristic acid, palmitic acid, stearic acid, oleic acid, linoleic acid, and mixtures of the fatty acids which are derived from natural fats and oils such as tallow, coconut oil, palm kernel oil, soybean oil, whale oil, fish oil, tall oil and the like.

The water soluble lower aliphatic α-amino monocarboxylic acid salts which can be used in the process of this invention have at least one reactive hydrogen attached to the nitrogen atom and have the general formula

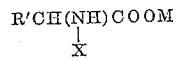

wherein R′ is a hydrogen atom or an alkyl or hydroxyalkyl radical having one to about four carbon atoms, X is a hydrogen atom, a methyl group or an ethyl group, and M is an alkali metal (e.g. sodium or potassium), ammonium, or an ethanol or propanol substituted ammonium (e.g. triethanolamine). Examples of α-amino acids whose salts can be used in the process of the invention to produce the amides, include the simple amino acids such as glycine (amino-ethanoic acid), serine (α-amino-β-hydroxy-propionic acid), alanine (α-amino propanoic acid), valine (α-amino-isovaleric acid), leucine (α-amino isocaproic acid), or simple derivatives of such acids such as the N-methyl and N-ethyl derivatives, e.g. sarcosine (N-methyl glycine) and the like.

The reaction of the process of this invention is illustrated by the following equation:

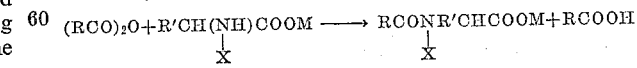

(wherein RCO,R′, X and M are as noted above). The reaction is rapid and exothermic.

In order for the reaction to be complete, it is essential that at least one mole of higher fatty acid anhydride be used for each mole of amino acid salt. Fatty acid anhydride in excess of one mole per mole of amino acid salt is not required, but such larger amounts may be used. If at least one mole of fatty acid anhydride per mole of amino acid salt is not used, the free fatty acid formed will react with the amino acid salt, remaining as an excess after all of the fatty acid anhydride has reacted, to form an undesirable amino soap according to the following equation:

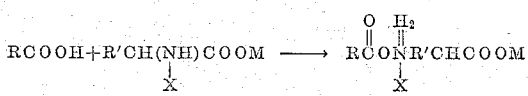

(wherein RCO, R' X and M are as noted above). However, if at least one mole of fatty acid anhydride per mole of amino acid salt is used, this undesirable side reaction does not take place since the amino acid salt apparently has a much greater tendency to react with the anhydride than the free fatty acid. There is no critical upper limit to the number of moles of higher fatty anhydride which can be reacted with each mole of amino acid salt. Practical considerations, such as the amount of free fatty acid or unhydrolyzed fatty acid anhydride in the final reaction product to be utilized or removed, indicate that not more than about two moles of higher fatty acid anhydride should be reacted with each mole of amino acid salt. Since water is present in the reaction mixture, any excess fatty acid anhydride tends to hydrolyze slowly to free fatty acid after the principal reaction is complete.

In the reaction of this invention, salts of the α-amino acids must be used. If the amino acids are used, the reaction between the fatty acid anhydride and the amino acid will not be rapid and complete and undesirable side reactions will take place. For this reason, the presence of any agent in the reaction mixture which will acidify the amino acid salt to the acid, must be avoided.

The fatty acid anhydrides and the amino acid salts can be the sole reactants in the process of this invention. No catalysts or alkaline agents are desirable, nor are they required for the reaction to proceed to completion. An alkaline agent is an agent such as sodium hydroxide which will saponify the free fatty acid in the reaction mixture. A combination of soap and acyl sarcosinate, for example, has beneficial uses as a cleansing agent, but a process where the formation of soap is not a normal result is one of the outstanding advantages of this invention. Soapless detergent compositions are advantageous in hard water areas where the presence of soap tends to cause curd formation which may detract from the performance of the synthetic detergent.

The reaction of this invention proceeds to completion at comparatively low temperatures and when the amino acid salt is used in aqueous solution. Since the simplicity, rapidity and completeness of the process are obtained when the fatty acid anhydride is in the liquid form, the temperature of the reaction should be above the melting point of the fatty acid anhydride. The maximum temperatures employed in the reaction between the fatty acid anhydride and the amino acid salts in the process of this invention should not exceed about 200° F. since elevated temperatures encourage side reactions which result in the formation of undesirable odoriferous and discoloring impurities. The aforementioned fatty acid anhydrides which can be used in the process have melting points below 200° F. Temperatures as low as 50° F. may be used so long as the fatty acid anhydride used is in liquid form. Preferred reaction temperatures are in the range of about 100° F. to about 200° F.

Agitation is required for the reaction to take place; the reaction is complete in less than 30 minutes; usually the reaction is complete in a few minutes. The reaction proceeds readily at atmospheric pressure. The reaction is preferably carried out by introducing liquid fatty acid anhydride into an aqueous solution of the amino acid salt although any method of combining the two liquid phases is satisfactory. After the reaction is complete, a mixture of the acyl amide of the amino acid salt and free fatty acid is obtained which is usually homogeneous. The water present is dispersed in this mixture.

The amount of water in the aqueous solution of the amino acid salt is not critical but it is advantageous to use sufficient water to control the heat of the reaction preventing the temperature from substantially exceeding about 200° F. although other cooling means, such as the use of excess fatty acid anhydride or external cooling of the reaction mixture, may be used for such a purpose. The presence of water also facilitates agitation of the reaction mixture. The concentration of the amino acid salt in aqueous solution can be from about 5% to about 50%. An inert solvent such as ethylene dichloride or acetone can be added to the aqueous reaction mixture if a decrease in viscosity and temperature are desired.

The resulting product of the process, a mixture of acyl amide of an amino acid salt and free fatty acid, is useful per se in the manufacture of detergent bars, for example where the fatty acid acts as a binding agent for the acyl amide of amino acid salt. This product can be made directly into detergent bars by conventional bar milling or framing processes, for example, after an appropriate adjustment of the water level in the mixture.

The reaction mixture containing the acyl amide of an amino acid salt and free fatty acid can be made into a mixture of synthetic detergent and soap, which mixture is free of amino acid salt and inorganic salt and is useful in cleansing operations, especially in soft water, simply by saponifying the free fatty acid with the addition of a caustic soda solution or other bases such as triethanolamine. The neutralization of the free fatty acid is rapid and complete at about 150° F.

Preferably, the free fatty acid (including any unhydrolyzed excess fatty acid anhydride) is removed from the acyl amide of the amino acid salt to yield a substantially pure surface active product. For example, there are many uses for this surface active product in which the presence of free fatty acid (which is water insoluble) is undersirable, for instance as a detergent in a clear shampoo, as a foaming agent in a dentifrice, as a wetting agent in an electroplating bath or as an anticorrosive agent for ferrous metals. It is comparatively easy to separate the free fatty acid from the acyl amide of the amino acid salt. One separation method, for example, is to mix the reaction mixture with a preferential solvent for the fatty acid such as petroleum ether (ligroin), ethylene dichloride, benzene or other well known hydrocarbon and chlorinated hydrocarbon solvents which are solvents for fatty acids and are substantially water insoluble. The addition of such a solvent results in the formation of two phases, an aqueous phase with the acyl amide of the amino acid salt dissolved therein and a solvent phase with the fatty acid dissolved therein. Sufficient solvent to dissolve all of the fatty acid present should be used; this amount will usually be about at least two times by weight of the amount of fatty acid present. The two phases can be separated by decanting, centrifuging and the like. A ternary solvent system containing water, ethanol and ligroin, for example, is advantageous, since the mixture of water and ethanol tends to retain the acyl amide of the amino acid salt more strongly in solution than water alone.

The following example will serve to illustrate the practice of the process of this invention, but the invention is not limited to the specific examples, other variations being readily discernible to those skilled in the art after reading the description of the invention herein contained.

*Example*

100 parts (0.262 mole) by weight of molten lauric acid anhydride were poured into a mixing vessel containing 170 parts by weight of an aqueous solution of sodium sarcosinate (sodium N-methyl glycine). The solution was a 13% solution based on sarcosine and contained 0.248 mole of sodium sarcosinate. The mixture was agitated at a temperature of about 140° F. The reaction was complete in about 2 minutes, the resulting product being a homogeneous mixture of sodium lauroyl sarcosinate and lauric acid. This product was diluted with 600 parts by weight of a 33% aqueous solution of ethanol. The lauric acid was extracted six times from the aqueous ethanol solution of the lauroyl sarcosinate, each time with 200 parts by weight of petroleum ether (ligroin). The lauroyl sarcosinate solution was then evaporated to a viscous clear paste on a steam bath. The sodium lauroyl sarcosinate was salt-free, soap-free and free from sodium sarcosinate, contained less than 1% lauric acid, and was substantially free from undesirable color and odor. It foamed strongly and cleaned well in a washing test. It also finds use as a foam stabilizer, anti-corrosive agent, emulsifier and as a foaming agent in toothpaste.

Other fatty acid anhydrides such as the anhydride of coconut oil fatty acids, stearic acid anhydride, or oleic acid anhydride may be substituted, in equivalent amounts for the lauric acid anhydride in the above example with substantially the same results, i.e. a simple, rapid, complete reaction giving a salt-free, soap-free compound free from unreacted sodium sarcosinate.

Other amino acid salts such as the sodium, potassium ammonium or triethanolamine salts of glycine, alanine, valine, serine, leucine may be substituted for the sodium sarcosinate in the above example with substantially the same results, i.e. a simple, rapid, complete reaction giving a salt-free, soap-free compound free from unreacted amino acid salts.

Other separation methods, of which persons skilled in the art are well aware, are substantially as suitable as the petroleum ether extraction described in the above example. For example, acetone, although it is miscible with water, acts as a preferential solvent for free fatty acid in the aqueous reaction mixture of the process of this invention.

The acyl amides of amino acid salts obtained in the process of this invention find use as surface active agents, detergents and emulsifiers. Because of their mild feel and good foaming properties they are favored for personal use, being utilized in cosmetics, pharmaceuticals, skin cleansers, shaving cream and shampoos. For personal use, an impurity-free product is particularly desirable. The acyl sarcosinates are widely used as anti-corrosive agents.

What is claimed is:

1. A method of preparing a higher molecular weight acyl amide of an amino acid salt having the formula

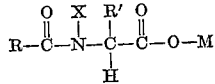

wherein
R is an alkyl radical having from about 10 to about 18 carbon atoms,
R' is selected from the group consisting of
  hydrogen, and
  alkyl and hydroxyalkyl radicals having from 1 to about 4 carbon atoms,
X is selected from the group consisting of
  hydrogen, and
  methyl and ethyl groups,
and M is selected from the group consisting of
  alkali metal,
  ammonium, and
  ethanol and propanol substituted ammonium radicals
consisting essentially of the following steps:
  (1) reacting (A) at least one mole of a higher molecular weight fatty acid anhydride having the formula $(RCO)_2O$ in which R is a fatty acid radical having from about 10 to about 18 carbon atoms
    with (B) an aqueous solution of one mole of a water soluble salt of a lower molecular weight aliphatic α-amino monocarboxylic acid having a reactive hydrogen atom attached to the nitrogen atom and having the formula

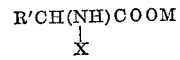

wherein R', X and M are as defined above,
the concentration of said amino acid in said aqueous solution being from about 5% to about 50% (weight)
within a temperature range of 100° F. to about 200° F. for a period of less than 30 minutes, and agitating the reaction mixture during the course of the reaction.

2. The process of claim 1 including the step of recovering the acyl amide of said amino acid salt as a substantially pure product.

3. The process of claim 1 in which the anhydride is lauric acid anhydride and the amino acid salt is sodium sarcosinate.

References Cited in the file of this patent

UNITED STATES PATENTS

| | | |
|---|---|---|
| 1,990,453 | Hund et al. | Feb. 5, 1935 |
| 2,047,066 | Glietenberg | July 7, 1936 |
| 2,047,069 | Hentrich et al. | July 7, 1936 |
| 2,063,987 | Dreyfus | Dec. 15, 1936 |
| 2,096,749 | Kritchevsky | Oct. 26, 1937 |

OTHER REFERENCES

Wilson et al.: J. Chem. Soc. 103, 1959–1973 (1913).
Richter: Textbook of Organic Chemistry, page 204, 1938 Edition, John Wiley and Sons, New York, N.Y.